(12) United States Patent
Bury

(10) Patent No.: US 8,379,739 B2
(45) Date of Patent: Feb. 19, 2013

(54) METHOD AND SYSTEM FOR IMPACT MITIGATION OF SUDDEN CARRIER FREQUENCY SHIFTS IN OFDM RECEIVERS

(75) Inventor: Andreas Bury, Dresden (DE)

(73) Assignee: ST Ericsson SA, Plan-les Ouates (CH)

( * ) Notice: Subject to any disclaimer, the term of this patent is extended or adjusted under 35 U.S.C. 154(b) by 983 days.

(21) Appl. No.: 12/400,248

(22) Filed: Mar. 9, 2009

(65) Prior Publication Data

US 2009/0232257 A1 Sep. 17, 2009

(30) Foreign Application Priority Data

Mar. 10, 2008 (EP) .................................. 08102450

(51) Int. Cl.
*H04K 1/10* (2006.01)

(52) U.S. Cl. ........ 375/260; 375/267; 375/296; 375/299; 375/346; 375/347; 375/349

(58) Field of Classification Search .................. 375/260, 375/267, 296, 299, 346, 347, 349
See application file for complete search history.

(56) References Cited

U.S. PATENT DOCUMENTS

| | | | | | |
|---|---|---|---|---|---|
| 5,802,117 | A | * | 9/1998 | Ghosh | 375/344 |
| 7,433,298 | B1 | * | 10/2008 | Narasimhan | 370/208 |
| 2007/0025457 | A1 | | 2/2007 | Wang | |
| 2007/0110175 | A1 | * | 5/2007 | Fechtel | 375/260 |

FOREIGN PATENT DOCUMENTS

| | | |
|---|---|---|
| EP | 0 896 457 A1 | 2/1999 |
| EP | 1 193 934 A2 | 4/2002 |

OTHER PUBLICATIONS

ETSI EN 300 744 V1.5.1, "Digital Video Broadcasting (DVB): Framing structure, channel coding and modulation for digital terrestrial television," Nov. 2004, pp. 1-64.
ETSI EN 302 304 V.1.1.1, "Digital Video Broadcasting (DVB): Transmission system for handheld terminals (DVB-H)," Nov. 2004, pp. 1-14.

* cited by examiner

*Primary Examiner* — Kabir A Timory
(74) *Attorney, Agent, or Firm* — Potomac Patent Group PLLC

(57) ABSTRACT

This disclosure relates to a method and system for impact mitigation of sudden carrier frequency shifts in OFDM receivers that transforming a received complex digital baseband signal and decoding data from the transformed signal.

21 Claims, 2 Drawing Sheets

METHOD AND SYSTEM FOR IMPACT MITIGATION OF SUDDEN CARRIER FREQUENCY SHIFTS IN OFDM RECEIVERS

BACKGROUND

1. Technical Field

This disclosure relates to a system and method for impact mitigation of sudden carrier frequency shifts in OFDM receivers.

2. Description of the Related Art

In a GSM mobile phone with an integrated DVB-H (digital video broadcast-handheld) receiver for mobile TV reception it is desirable to share a common reference clock for reduction of cost, size, and power consumption. Certain GSM mobile phone implementations tune the reference clock by a few Hz in order to adapt to the reference clock of the base station. This tuning of the reference clock may occur as sudden frequency jumps. As a consequence, the local oscillator frequency of the DVB-H receiver will jump by the same relative amount as the reference frequency. For DVB-H reception, the amount of frequency jump may be up to about ¼ of the sub-carrier spacing of the underlying orthogonal frequency division multiplexing (OFDM) transmission method. If this amount of frequency shift is not compensated for, it causes severe interference between adjacent OFDM sub-carriers, such that the error probability at the receiver increases dramatically, causing loss of information in the video stream.

BRIEF SUMMARY

A subject of this disclosure provides a method and an arrangement for quickly detecting suddenly occurring frequency shifts of the received signal, measuring the amount of frequency offset, and compensating accordingly, in order to minimize the impact of the frequency jump.

A DVB-H receiver complies to ETSI EN 300744, V1.5.1: Digital Video Broadcasting (DVB): "Framing structure, channel coding and modulation for digital terrestrial transmission", 2004; and in ETSI EN 302304, V1.1.1: Digital Video Broadcasting (DVB): "Transmission system for handheld terminals (DVB-H)", 2004.

Certain GSM mobile phone transceiver implementations adapt their reference clock to the reference clock of the associated GSM base station. The reference clock is typically adapted by a voltage control, e.g., by a voltage controlled temperature compensated crystal oscillator (VCTCXO). This adaptation may occur as jumps, especially during handover from one GSM base station to another one.

In a DVB-H receiver implemented in a GSM device, several clocks are generated within a clock generation unit using a phase locked loop (PLL). The local oscillator (LO) frequency as well as the sampling clock are fixedly related to the reference clock. Since the DVB-H receiver uses the same reference clock, the change of the reference frequency will cause a proportional change of the LO frequency which controls the selected received frequency band as well as the sampling clock and all other frequencies derived from it.

FIG. 1 shows a OFDM receiver which employs phase tracking (also called common phase error correction) to reduce the impact of low frequency phase noise in the LO carrier of both the receiver and the transmitter, and frequency tracking to adapt to a slow mutual drift of transmitter and receiver LO carrier frequencies.

As is further shown in FIG. 1, the input signal is a complex digital baseband receive signal. It is frequency-shifted by multiplication with a complex rotating exponential function with a constant phase increment from sample to sample. After removing the guard interval, the Fast Fourier Transform converts a block of received samples into corresponding frequency-domain symbols. The common phase error, i.e., the average phase rotation in the complex plane from one OFDM symbol to the next, is estimated, and it is used as an input for both phase tracking and frequency tracking. For frequency tracking, the phase delta is fed into a loop filter which adjusts the compensation frequency value at the frequency offset compensation unit. For phase tracking, the phase delta is accumulated and used as a compensation phase in the common phase error compensation. After this, the channel transfer function is estimated and used to demodulate the data. Demodulated data are fed into a combined de-interleaving and error correcting decoding to obtain the received data. In DVB-H, this combined de-interleaving and error correcting decoding typically has three layers, a bit and symbol de-interleaver with a Viterbi decoder, a convolutional de-interleaver with a Reed-Solomon decoder, and a large block de-interleaver with a second Reed-Solomon decoder.

A fast jump of the down-converter frequency in the DVB-H receiver causes only a slow adaptation of the frequency tracking. As a result, the frequency offset is compensated for slowly, meaning that a large number of OFDM symbols is severely affected by inter-carrier interference. This may result in erroneous receive data and visual errors or dropouts of TV reception.

An embodiment reduces the impact of frequency shifts caused by reference clock adaptation in a GSM device on OFDM symbol reception in a DVB-H receiver implemented in the GDM device. An embodiment of a method comprises the steps of determining a frequency jump in preparation of the complex digital baseband receive signal by comparing the phase change of the signal with a threshold value of the phase and, during signal transformation, preventing failures caused by such frequency jump.

In an embodiment, the method comprises the steps of: compensating a frequency offset of a complex digital baseband receive signal at an input of the arrangement; removing a guard interval from the frequency shifted signal; converting a block of received samples of the signal with the guard interval removed into corresponding frequency-domain symbols; estimating the average phase rotation in the complex plane from one OFDM symbol to the next one and generating a phase delta as an output; adjusting the compensation frequency value at the frequency offset compensation unit using the phase delta as an input; accumulating the phase delta and generating a compensation phase; compensating common phase error of the signal with the frequency-domain symbols; estimating the channel transfer function from the phase error compensated signal; demodulating data from the phase error compensated signal using the estimated channel transfer function; de-interleaving and error correcting the demodulated data and decoding same to obtain received data; comparing an absolute value of the estimated common phase error with an adjustable threshold; and determining that a frequency jump has been detected if the threshold is exceeded.

Three example methods of compensating for a detected frequency jump are discussed below. The three example methods may be employed separately or combined with each other or with other methods of addressing a detected frequency jump in various embodiments.

A first example embodiment of a method of compensating for a detected frequency jump comprises the steps of: forcing a pause of frequency tracking and keeping the last compensation frequency value; concurrently forcing common phase error estimation, in case it was not used by default; estimating the frequency offset based on the phase delta between two subsequent OFDM symbols once the frequency jump has settled; adding the frequency offset to the last setting of the compensation frequency and adopting the summed value as the new compensation frequency; once, this new value has been set, switching on again the frequency tracking.

A second example embodiment of a method of compensating for a detected frequency jump comprises adapting a time-interpolation across several OFDM symbols during channel estimation such that corrupted OFDM symbols are determined, wherein the time-interpolation across several OFDM symbols inside the channel estimator may be adapted such that corrupted OFDM symbols which contain severely distorted pilot symbols are ignored in channel estimation during one cycle of frequency jump exception states.

A third example embodiment of a method of compensating for a detected frequency jump comprises enabling dedicated algorithms inside the demodulation unit which improve reception in presence of inter-carrier interference, such as inter-carrier interference subtraction during one cycle of frequency jump exception states.

In one embodiment, a system comprises means for determining a frequency jump in preparation of the complex digital baseband receive signal by comparing the phase change of the signal with a threshold value of the phase, and means for preventing failures caused by a frequency jump during signal transformation.

In one embodiment, the system comprises: means for compensating a frequency offset of a complex digital baseband receive signal at an input of the arrangement, for instance a frequency offset compensation unit; means for removing the guard interval from the frequency shifted signal, for instance a guard interval removal unit; means for converting a block of received samples of the signal with the guard interval removed into corresponding frequency-domain symbols, for instance a Fast Fourier Transformation unit; means for estimating the average phase rotation in the complex plane from one OFDM symbol to the next one and for generating a phase delta at its output, for instance a common phase error estimation unit; means for adjusting the compensation frequency value at the frequency offset compensation unit using the phase delta at an input, for instance a frequency tracking loop filter; means for accumulating the phase delta and generating a compensation phase, for instance a phase error integrator; means for compensating the common phase error of the signal with the frequency-domain symbols, for instance a common phase error compensation unit; means for estimating the channel transfer function from the phase error compensated signal, for instance a channel estimation unit; means for demodulating data from the phase error compensated signal using the estimated channel transfer function, for instance a demodulation unit; means for de-interleaving and error correcting the demodulated data and for decoding to obtain received data, for instance a de-interleaver/error correcting decoder; means for comparing an absolute value of the estimated common phase error with an adjustable threshold, for instance a frequency offset estimator; and means for determining that a frequency jump has been detected if the threshold is exceeded, for instance a frequency jump detector.

Three example embodiments of systems for compensating for a detected frequency jump are discussed below. The three example embodiments may be employed separately or combined with each other or with other systems and subsystems of addressing a detected frequency jump in various embodiments. Compensating for frequency jumps may, for example, prevent failures caused by a frequency jump during signal transformation.

A first example embodiment of a system comprises means for determining that a frequency jump has been detected if the threshold is exceeded and means for performing the following actions: forcing a pause of frequency tracking and keeping the last compensation frequency value; concurrently forcing common phase error estimation, in case it was not used by default; estimating the frequency offset based on the phase delta between two subsequent OFDM symbols once the frequency jump has settled; adding the frequency offset to the last setting of the compensation frequency and taking the summed value as the new compensation frequency; once this new value has been set, switching on again the frequency tracking.

These means are implemented for instance by a frequency jump detector, a frequency offset estimator, and an exception controller which runs a state machine triggered by a detected frequency jump and which is connected with the frequency offset estimator and the frequency tracking loop filter.

A second example embodiment of a system comprises means for adapting a time-interpolation across several OFDM symbols during channel estimation such that corrupted OFDM symbols are determined, wherein the time-interpolation across several OFDM symbols within channel estimator may be adapted such that corrupted OFDM symbols which contain severely distorted pilot symbols are ignored in channel estimation during one cycle of frequency jump exception states. Those means are implemented for instance by an exception controller which runs a state machine triggered by a detected frequency jump and which is connected with the channel estimation unit.

A third example embodiment of a system comprises means for enabling dedicated algorithms inside the demodulation unit which improve reception in presence of inter-carrier interference, such as inter-carrier interference subtraction during one cycle of frequency jump exception states, for instance an exception controller which runs a state machine, triggered by a detected frequency jump, the exception controller being connected to the demodulation unit.

In one embodiment, a method of decoding a complex digital baseband signal in an OFDM receiver comprises: receiving a complex digital baseband signal; transforming the received signal; detecting a frequency jump by comparing a phase change of the transformed signal with a threshold phase value; compensating for the detected frequency jump; and decoding data from the transformed signal. In one embodiment, the method comprises: compensating for a frequency offset of the received complex digital baseband signal, generating a frequency shifted signal; removing a guard interval from the frequency shifted signal; converting a block of received samples of the signal with the guard interval removed into corresponding frequency-domain symbols; estimating an average phase rotation in a complex plane from one OFDM symbol to a next OFDM symbol and generating a phase delta as an output; adjusting a compensation frequency value using the phase delta as an input; accumulating the phase delta and generating a compensation phase; compensating for common phase error of the signal with the frequency-domain symbols; estimating a channel transfer function from the phase error compensated signal; demodulating data from the phase error compensated signal using the estimated channel transfer function; de-interleaving and error correcting the demodulated data and decoding same to obtain received data; comparing an absolute value of the phase delta with an adjustable threshold; and determining that a frequency jump has been detected if the threshold is exceeded. In one embodiment, compensating for a detected frequency jump comprises: pausing frequency tracking and keeping a last compensation frequency value; forcing common phase error estimation; estimating the frequency offset based on the phase delta between two subsequent OFDM symbols after the frequency jump has settled; adding the estimated frequency offset to the last compensation frequency value and adopting the summed value as a new compensation frequency value; and once this new compensation frequency value has been set, switching on again the frequency tracking. In one embodiment, compensating for a detected frequency jump comprises: adapting a time-interpolation across several OFDM symbols during channel estimation such that corrupted OFDM symbols are determined, wherein corrupted OFDM symbols which contain heavily distorted pilot symbols are ignored in channel estimation during one cycle of frequency jump exception state. In one embodiment, compensating for a detected frequency jump comprises: enabling dedicated algorithms during demodulation which improve reception in presence of inter-carrier interference. In one embodiment, compensating for a detected frequency jump comprises performing inter-carrier interference subtraction during one cycle of frequency jump exception state. In one embodiment, compensating for a detected frequency jump further comprises: pausing frequency tracking and keeping a last compensation frequency value; forcing common phase error estimation; estimating the frequency offset based on the phase delta between two subsequent OFDM symbols after the frequency jump has settled; adding the estimated frequency offset to the last compensation frequency value and adopting the summed value as a new compensation frequency value; and once this new compensation frequency value has been set, switching on again the frequency tracking. In one embodiment, compensating for a detected frequency jump further comprises: ignoring OFDM symbols which contain heavily distorted pilot symbols during one cycle of a frequency jump exception state.

In one embodiment, a system comprises: means for transforming a complex digital baseband signal; means for decoding data coupled to the means for transforming; means for detecting frequency jumps including means for comparing a phase change to a threshold value; and means for compensating for detected frequency jumps during signal transformation coupled to the means for detecting frequency jumps. In one embodiment, the system comprises means for compensating for frequency offsets; means for removing guard intervals coupled to the means for compensating for frequency offsets; means for converting blocks of received samples into corresponding frequency-domain symbols coupled to the means for removing guard intervals; means for estimating average phase rotation in a complex plane from one OFDM symbol to a next OFDM symbol and for generating a phase delta; means for adjusting a compensation frequency value coupled to the means for estimating and the means for compensating for frequency offsets; means for accumulating the phase delta and generating a compensation phase; means for compensating for common phase error of frequency-domain symbols; means for estimating channel transfer functions coupled to the means for compensating for common phase error; means for demodulating data coupled to the means for compensating for common phase error and to the means for estimating channel transfer functions; means for de-interleaving, error correcting and decoding demodulated data coupled to the means for demodulating; and means for comparing an absolute value of the phase delta with an adjustable threshold. In one embodiment, the means for compensating for detected frequency jumps is configured, in response to a detected frequency jump, to: pause frequency tracking; force common phase error estimation; estimate a frequency offset based on a phase delta between two subsequent OFDM symbols once the frequency jump has settled; add the estimated frequency offset to a last compensation frequency and adopting the summed value as a new compensation frequency; and resume frequency tracking based on the new compensation frequency. In one embodiment, the means for compensating for detected frequency jumps comprises: means for detecting and ignoring corrupted OFDM symbols which contain severely distorted pilot symbols during one cycle of frequency jump exception state. In one embodiment, the means for compensating for frequency jumps comprises: means for enabling dedicated algorithms during demodulation which improve reception in a presence of inter-carrier interference. In one embodiment, the means for compensating for frequency jumps is configured to perform inter-carrier interference subtraction during one cycle of a frequency jump exception state. In one embodiment, the system comprises: a frequency offset compensation unit configured to receive a complex digital baseband signal frequency-shifted by multiplication with a complex rotating exponential function with constant phase increment from sample to sample; a guard interval removing unit; a Fast Fourier Transformation unit configured to convert a block of received samples into corresponding frequency-domain symbols; a common phase error estimation unit configured to estimate an average phase rotation in a complex plane from one OFDM symbol to a next OFDM symbol and to generate a phase delta; a frequency tracking loop filter configured to adjust a compensation frequency value at the frequency offset compensation unit based on the phase delta; a phase error integrator configured to accumulate the phase delta and generate a compensation phase; a common phase error compensating unit configured to generate a phase error compensated signal; a channel estimation unit configured to estimate a channel transfer function from the phase error compensated signal; a demodulation unit configured to demodulate the data; and a decoder configured to de-interleave, error correct and decode the demodulated data. In one embodiment, the system comprises: a frequency jump detector; a frequency offset estimator; and an exception controller including a state machine triggered by a detected frequency jump. In one embodiment, the means for de-interleaving, error correcting and decoding the demodulated data comprises three layers: a bit and symbol de-interleaver with a Viterbi decoder; a convolutional de-interleaver with a Reed-Solomon decoder; and a large block de-interleaver with a second Reed-Solomon decoder.

In one embodiment, a system comprises: a transform block configured to transform a received complex digital baseband signal; a decoding block configured to decode the transformed signal; a frequency jump detector configured to detect a frequency jump by comparing phase changes in the transformed signal to a threshold; and a frequency jump compensation block configured to compensate for a detected frequency jump. In one embodiment, the frequency jump compensation block comprises: an exception controller; and a frequency offset estimator. In one embodiment, the exception controller comprises a state machine. In one embodiment, the transform block comprises: a frequency offset compensator; a guard interval remover; a Fourier transform block; a phase error estimator; a frequency tracking loop filter; a phase error integrator; and a common phase error compensator. In one embodiment, the decoding block comprises: a channel estimator; a demodulator; and a decoder.

In one embodiment, a computer readable storage medium stores instructions that, when executed, cause an OFDM receiver to perform a method comprising: detecting a frequency jump by comparing a phase delta of a transformed signal to a threshold; and compensating for the detected frequency jump. In one embodiment, compensating for the detected frequency jump comprises: performing inter-carrier interference subtraction. In one embodiment, compensating for the detected frequency jump comprises: ignoring corrupted OFDM symbols. In one embodiment, compensating for the detected frequency jump comprises: pausing frequency tracking; forcing common phase error estimation; estimating a frequency offset based on a phase delta between two subsequent OFDM symbols; adding the estimated frequency offset to a last compensation frequency and adopting the summed value as a new compensation frequency; and resuming frequency tracking based on the new compensation frequency.

BRIEF DESCRIPTION OF THE SEVERAL VIEWS OF THE DRAWINGS

For a more complete understanding of the present disclosure and further objects and advantages thereof, reference is now made to the following description of exemplary embodiments as shown in the accompanying drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
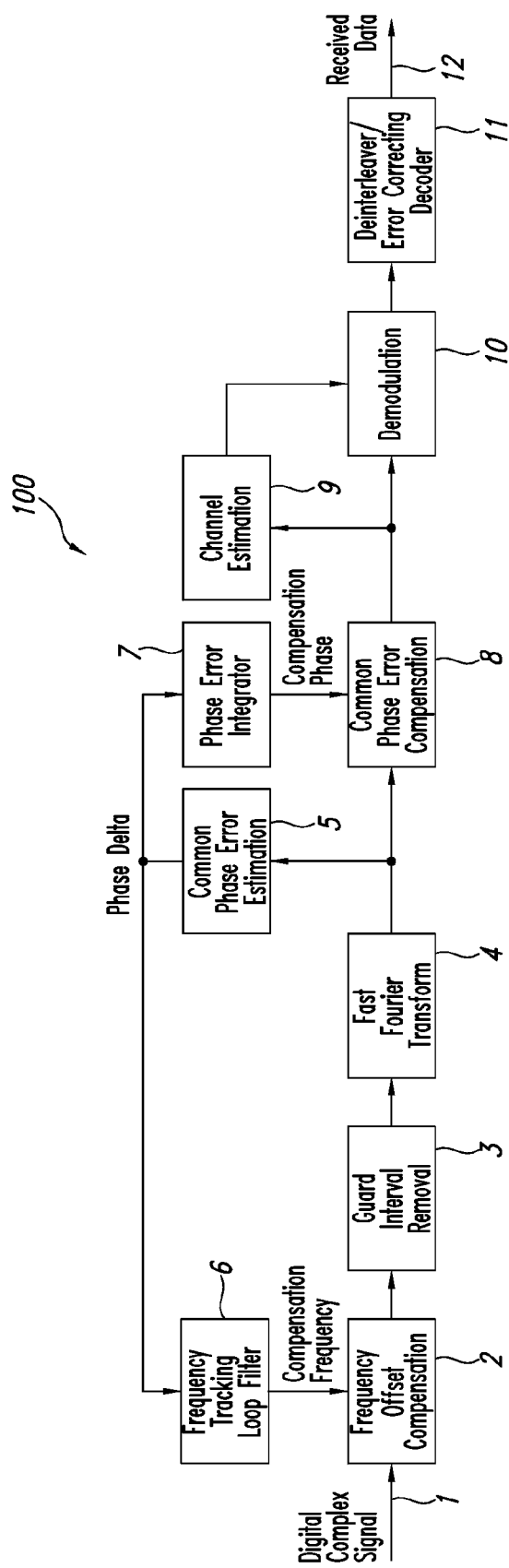
FIG. 1 shows a schematic diagram of an OFDM receiver used as a DVB-H receiver.

The OFDM receiver 100 shown in FIG. 1 receives a complex digital baseband receive signal at an input 1. Input 1 is an input of a frequency offset compensation unit 2. The compensated signal from frequency offset compensation unit 2 is fed to a guard interval removal unit 3. After removing the guard interval, a Fast Fourier Transform unit 4 converts a block of received samples into corresponding frequency-domain symbols. A phase error estimation unit 5 performs phase tracking on the signal from Fast Fourier Transform unit 4. Furthermore, the receiver includes a frequency tracking loop filter 6. The common phase error, i.e., the average phase rotation in the complex plane from one OFDM symbol to the next one, is estimated by the common phase error correction unit 5, and the calculated phase delta is used as an input for both phase tracking in a phase error integrator 7 and a phase error compensation unit 8 and frequency tracking in frequency tracking loop filter 6 which adjusts the compensation frequency value at the frequency offset compensation unit 2. For phase tracking, the phase delta is accumulated in phase error integrator 7 and is used as a compensation phase in common phase error compensation unit 8. Then, the channel transfer function is estimated in a channel estimation unit 9 and is used to demodulate the data in a demodulation unit 10. Demodulated data are fed into a combined de-interleaving and error correcting decoder 11 to obtain the received data at an output 12. In DVB-H, this combined de-interleaving and error correcting decoder 11 typically comprises three layers, a bit and symbol de-interleaver with a Viterbi decoder, a convolutional de-interleaver with a Reed-Solomon decoder, and a large block de-interleaver with a second Reed-Solomon decoder.

A fast jump of the down-converter frequency in the DVB-H receiver depicted in FIG. 1 causes only a slow adaptation of frequency tracking loop filter 6. As a result, the frequency offset is compensated only slowly in frequency offset compensation unit 2. This results in a large number of OFDM symbols being severely affected by inter-carrier interference. This may result in erroneous receive data and visual errors or dropouts of TV reception.

Figure 2:
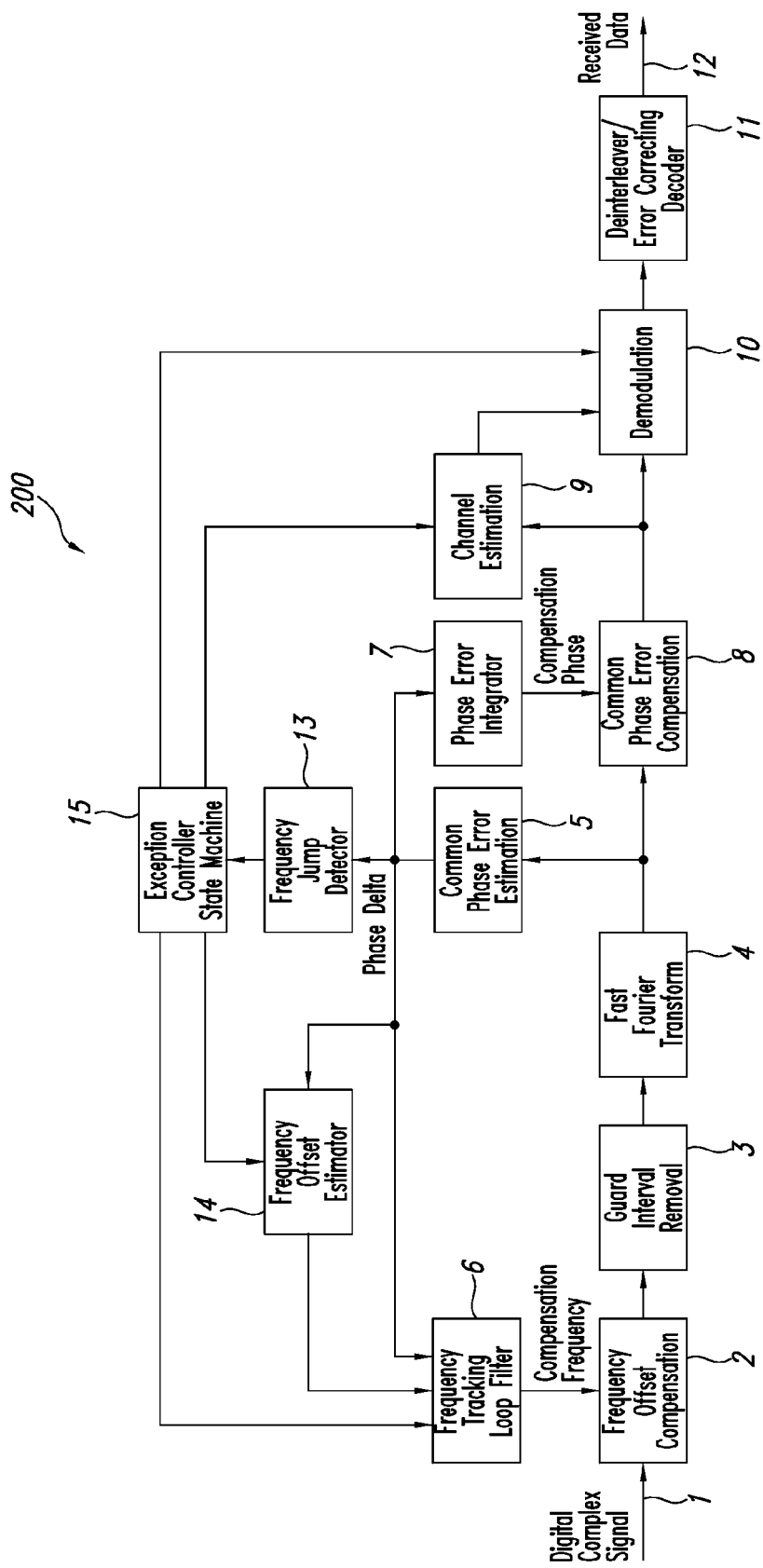
FIG. 2 shows a schematic diagram of an embodiment of an OFDM receiver incorporating concepts discussed herein.

The embodiment of a system 200 shown in FIG. 2 comprises a frequency jump detector 13, a frequency offset estimator 14, and an exception controller 15 which runs a state machine triggered by a detected frequency jump.

Frequency jump detector 13 compares the absolute value of the estimated common phase error with an adjustable threshold. If the threshold is exceeded, a frequency jump has been detected and the exception controller state machine 15 is triggered. The following actions are taken:

Frequency tracking is turned off, keeping the last compensation frequency value, and common phase error estimation is turned on in case it was not used by default.

Once the frequency jump has settled, the frequency offset is estimated based on the phase delta between two subsequent OFDM symbols. Then, the estimated frequency offset is added to the last setting of the compensation frequency, and the summed value is adopted as the new compensation frequency. Once this new value has been set, frequency tracking is switched on again.

During one cycle of frequency jump exception states, the time-interpolation across several OFDM symbols within channel estimation unit 9 may be adapted such that corrupted OFDM symbols which contain severely distorted pilot symbols are considered only as little as possible for channel estimation. The purpose of this is to provide an as clean as possible channel estimation for all OFDM symbols during the occurrence of the jump.

During one cycle of frequency jump exception states, the demodulation may enable dedicated algorithms within demodulation unit 10 which improve reception in presence of inter-carrier interference, such as an inter-carrier interference subtraction.

In one embodiment, the occurrence of a carrier frequency jump is detected by comparing the absolute value of the common phase error between two subsequent OFDM symbols with a defined threshold.

In another embodiment, the amount of frequency offset is estimated by multiplying the estimated common phase error between two subsequent OFDM symbols by a value, which may be an implementation specific constant.

In another embodiment, time interpolation within channel estimation unit 9 is adapted in a manner such that those OFDM symbols which are severely distorted by inter-carrier interference caused by the frequency offset are as little as possible considered for channel estimation.

In another embodiment, demodulation is controlled such that dedicated algorithms are enabled which improve reception in presence of inter-carrier interference, e.g., an inter-carrier interference subtraction.

The embodiments discussed herein may find application in mobile phones, personal digital assistants (PDA) and generally in any orthogonal frequency division multiplexing (OFDM) receivers.

The detailed description has set forth various embodiments of the devices and/or processes via the use of block diagrams and examples. Insofar as such block diagrams and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape. Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
   means for transforming a complex digital baseband signal;
   means for decoding data coupled to the means for transforming;
   means for detecting frequency jumps including means for comparing a phase change to a threshold value; and
   means for compensating for detected frequency jumps during signal transformation coupled to the means for detecting frequency jumps wherein the means for compensating for detected frequency jumps is configured, in response to a detected frequency jump, to:
   pause frequency tracking;
   force common phase error estimation;
   estimate a frequency offset based on a phase delta between two subsequent OFDM symbols once the frequency jump has settled;
   add the estimated frequency offset to a last compensation frequency to obtain a summed value and adopting the summed value as a new compensation frequency; and
   resume frequency tracking based on the new compensation frequency.

2. The system of claim 1, comprising:
   means for compensating for frequency offsets;
   means for removing guard intervals coupled to the means for compensating for frequency offsets;
   means for converting blocks of received samples into corresponding frequency-domain symbols coupled to the means for removing guard intervals;
   means for estimating average phase rotation in a complex plane from one OFDM symbol to a next OFDM symbol and for generating a phase delta;
   means for adjusting a compensation frequency value coupled to the means for estimating and the means for compensating for frequency offsets;
   means for accumulating the phase delta and generating a compensation phase;
   means for compensating for common phase error of frequency-domain symbols;
   means for estimating channel transfer functions coupled to the means for compensating for common phase error;
   means for demodulating data coupled to the means for compensating for common phase error and to the means for estimating channel transfer functions;
   means for de-interleaving, error correcting and decoding demodulated data coupled to the means for demodulating; and
   means for comparing an absolute value of the phase delta with an adjustable threshold.

3. The system of claim 1 wherein the means for compensating for detected frequency jumps comprises:
means for detecting and ignoring corrupted OFDM symbols which contain severely distorted pilot symbols during one cycle of frequency jump exception state.

4. The system of claim 1 wherein the means for compensating for frequency jumps comprises:
means for enabling dedicated algorithms during demodulation which improve reception in a presence of inter-carrier interference.

5. The system of claim 1 wherein the means for compensating for frequency jumps is configured to perform inter-carrier interference subtraction during one cycle of a frequency jump exception state.

6. The system of claim 1 wherein the system comprises:
a frequency offset compensation unit configured to receive a complex digital baseband signal frequency-shifted by multiplication with a complex rotating exponential function with constant phase increment from sample to sample;
a guard interval removing unit;
a Fast Fourier Transformation unit configured to convert a block of received samples into corresponding frequency-domain symbols;
a common phase error estimation unit configured to estimate an average phase rotation in a complex plane from one OFDM symbol to a next OFDM symbol and to generate a phase delta;
a frequency tracking loop filter configured to adjust a compensation frequency value at the frequency offset compensation unit based on the phase delta;
a phase error integrator configured to accumulate the phase delta and generate a compensation phase;
a common phase error compensating unit configured to generate a phase error compensated signal;
a channel estimation unit configured to estimate a channel transfer function from the phase error compensated signal;
a demodulation unit configured to demodulate the data; and
a decoder configured to de-interleave, error correct and decode the demodulated data.

7. The system of claim 1 wherein the system comprises:
a frequency jump detector;
a frequency offset estimator; and
an exception controller including a state machine triggered by a detected frequency jump.

8. A system comprising:
a transform block configured to transform a received complex digital baseband signal;
a decoding block configured to decode the transformed signal;
a frequency jump detector configured to detect a frequency jump by comparing phase changes in the transformed signal to a threshold; and
a frequency jump compensation block configured to compensate for a detected frequency jump wherein
the received complex digital baseband signal comprises blocks of received samples,
the transform block is configured to convert each block of received samples into a corresponding set of OFDM frequency domain symbols,
the frequency jump detector is configured to compare an average phase rotation between subsequent sets of OFDM frequency domain symbols to a threshold and to detect frequency jumps based on the comparison, and
the frequency jump compensation block is configured to respond to a detected frequency jump by:
halting frequency tracking;
maintaining a last compensation frequency value;
after the detected frequency jump has settled, estimating a post-jump average phase rotation between two subsequent symbols;
estimating a frequency offset based on the estimated post-jump average phase rotation;
adding the estimated frequency offset to the maintained last compensation frequency value; and
restarting frequency tracking.

9. The system of claim 8 wherein the frequency jump compensation block comprises:
an exception controller; and
a frequency offset estimator.

10. The system of claim 9 wherein the exception controller comprises a state machine.

11. The system of claim 8 wherein the transform block comprises:
a frequency offset compensator;
a guard interval remover;
a Fourier transform block;
a phase error estimator;
a frequency tracking loop filter;
a phase error integrator; and
a common phase error compensator.

12. The system of claim 8 wherein the decoding block comprises:
a channel estimator;
a demodulator; and
a decoder.

13. A non-transitory computer readable medium storing instructions that, when executed, cause an OFDM receiver to perform a method comprising:
detecting a frequency jump by comparing a phase delta of a transformed signal to a threshold; and
compensating for the detected frequency jump wherein the compensating for the detected frequency jump comprises:
pausing frequency tracking;
forcing common phase error estimation;
estimating a frequency offset based on a phase delta between two subsequent OFDM symbols;
adding the estimated frequency offset to a last compensation frequency and adopting the summed value as a new compensation frequency; and
resuming frequency tracking based on the new compensation frequency.

14. The non-transitory computer readable medium of claim 13 wherein the compensating for the detected frequency jump comprises:
performing inter-carrier interference subtraction.

15. The non-transitory computer readable medium of claim 13 wherein the compensating for the detected frequency jump comprises:
ignoring corrupted OFDM symbols.

16. A method, comprising:
receiving a complex digital baseband signal comprising blocks of received samples; and under control of at least one processing device:
fast Fourier transforming the blocks of received samples into a corresponding set of OFDM frequency domain symbols;
estimating average phase rotations between subsequent sets of OFDM frequency domain symbols;

performing frequency tracking by adjusting a compensation frequency value based on the estimated phase rotations;

comparing the estimated phase rotations to a threshold value;

detecting frequency carrier shifts based on the comparing; and compensating for detected frequency carrier shifts wherein the performing of the frequency tracking comprises:

adjusting a compensation frequency value based on the estimated phase rotations and the compensating for detected frequency carrier shift comprises:

maintaining a last value of the compensation frequency value and suspending the frequency tracking;

after the detected frequency carrier shift has settled, estimating a post-shift average phase rotation between two subsequent sets of OFDM frequency domain symbols;

estimating a frequency offset corresponding to the estimated post-shift average phase rotation;

adding the estimated frequency offset to the maintained last value of the compensation frequency value; and resuming the frequency tracking.

17. The method according to claim 16 further comprising:

compensating for a frequency offset of the received complex digital baseband signal, generating a frequency shifted signal;

removing a guard interval from the frequency shifted signal;

converting a block of received samples of the signal with the guard interval removed into corresponding frequency-domain symbols;

estimating an average phase rotation in a complex plane from one OFDM symbol to a next OFDM symbol and generating a phase delta as an output;

adjusting a compensation frequency value using the phase delta as an input;

accumulating the phase delta and generating a compensation phase;

compensating for common phase error of the signal with the frequency-domain symbols;

estimating a channel transfer function from the phase error compensated signal;

demodulating data from the phase error compensated signal using the estimated channel transfer function;

de-interleaving and error correcting the demodulated data and decoding same to obtain received data;

comparing an absolute value of the phase delta with an adjustable threshold; and determining that a frequency shift has been detected if the threshold is exceeded.

18. The method of claim 16 wherein compensating for a detected frequency shift comprises:

adapting a time-interpolation across several OFDM symbols during channel estimation such that corrupted OFDM symbols are determined, wherein corrupted OFDM symbols which contain heavily distorted pilot symbols are ignored in channel estimation during one cycle of frequency shift exception state.

19. The method of claim 16 wherein compensating for a detected frequency shift comprises:

enabling dedicated algorithms during demodulation which improve reception in presence of inter-carrier interference.

20. The method of claim 16 wherein compensating for a detected frequency shift comprises performing inter-carrier interference subtraction during one cycle of frequency shift exception state.

21. The method of claim 16 wherein compensating for a detected frequency shift further comprises:

ignoring OFDM symbols which contain heavily distorted pilot symbols during one cycle of a frequency shift exception state.

* * * * *